United States Patent
Eslambolchi et al.

[11] Patent Number: 5,644,237
[45] Date of Patent: Jul. 1, 1997

[54] METHOD AND APPARATUS FOR PRECISELY LOCATING A BURIED UTILITY CONVEYANCE

[75] Inventors: Hossein Eslambolchi, Basking Ridge, N.J.; John Sinclair Huffman, McDonough, Ga.

[73] Assignee: AT&T, Middletown, N.J.

[21] Appl. No.: 534,750

[22] Filed: Sep. 27, 1995

[51] Int. Cl.$^6$ .......................... G01R 19/00; G01V 3/08; G01V 3/10
[52] U.S. Cl. .................................. 324/326; 324/67
[58] Field of Search ................... 324/66, 67, 326, 324/228, 232, 327, 329, 539, 541, 543, 544

[56] References Cited

U.S. PATENT DOCUMENTS

| | | | |
|---|---|---|---|
| 3,832,724 | 8/1974 | Duval | 348/84 |
| 3,891,811 | 6/1975 | Miller | 324/66 |
| 4,143,251 | 3/1979 | Clark | 324/326 |
| 4,344,092 | 8/1982 | Miller | 348/373 |
| 4,372,658 | 2/1983 | O'Connor et al. | 324/220 X |
| 4,412,177 | 10/1983 | Petrini et al. | 324/219 X |
| 4,506,210 | 3/1985 | Chase | 324/66 |
| 4,642,556 | 2/1987 | Pecukonis | 324/67 |
| 4,686,454 | 8/1987 | Pecukonis | 324/326 |
| 4,804,907 | 2/1989 | Pecukonis | 324/67 |
| 4,961,111 | 10/1990 | Herlitz et al. | 348/82 |
| 5,084,764 | 1/1992 | Day | 348/84 |
| 5,089,895 | 2/1992 | Fraker et al. | 348/373 |
| 5,260,659 | 11/1993 | Flowerdew et al. | 324/326 |
| 5,298,987 | 3/1994 | Tomita | 348/82 |
| 5,438,265 | 8/1995 | Eslambolchi et al. | 324/326 |
| 5,444,364 | 8/1995 | Satterwhite et al. | 324/326 |

FOREIGN PATENT DOCUMENTS

| | | | |
|---|---|---|---|
| 0110069 | 9/1981 | Japan | 324/326 |
| 2204409 | 11/1988 | United Kingdom | 324/326 |

*Primary Examiner*—Sandra L. O'Shea
*Assistant Examiner*—J. M. Patidar
*Attorney, Agent, or Firm*—Robert B. Levy

[57] ABSTRACT

An underground utility conveyance (10) may be precisely located by impressing both a locating tone and a confirmation tone on the conveyance. The locating tone is an RF signal that produces a first field that radiates above the earth that is sensed by a first, above-ground signal detector (22) to establish the general location of the conveyance. The confirmation tone is a near-DC signal that produces a second field having a relatively limited radiation path. A second detector (24) is inserted into the earth at successive places in the region where the conveyance is located to establish its precise location.

8 Claims, 2 Drawing Sheets

METHOD AND APPARATUS FOR PRECISELY LOCATING A BURIED UTILITY CONVEYANCE

TECHNICAL FIELD

This invention relates generally to a method and apparatus for precisely locating an underground utility conveyance.

BACKGROUND ART

Many utilities bury their pipes and/or cables (hereinafter, "conveyances") underground for cosmetic reasons. Such underground burial also helps protect utility conveyances from natural elements, such as wind, rain and sunlight. However, underground burial of utility conveyances renders them susceptible to other types of harm, such as accidental severing or breakage due to inadvertent excavation by a contractor. To prevent this type of harm, utilities record the location of each buried conveyance. Upon notification by a contractor of an intent to excavate, a utility determines whether it has any conveyance likely to be affected. If the utility has such an underground conveyance, the utility will dispatch a technician to mark its location.

In the past, utilities have used electromagnetic signaling to locate underground conveyances. To that end, the utility applies an alternating current signal at a unique frequency to each buried conveyance, either directly, or to a separate wire buried adjacent to the conveyance. A technician seeking to locate the conveyance employs a cable-locating detector (i.e., a Radio Frequency (RF) receiver) tuned to the frequency of the signal impressed on the conveyance. Because of stray electromagnetic signals radiated by other underground conveyances lying nearby, the technician may not be able to locate the exact position of the conveyance of interest. Thus, the technician may have to physically uncover the buried conveyance to establish its exact location. Given that many conveyances buried by the same utility have a similar appearance, the technician may locate and protect the wrong conveyance.

U.S. Pat. No. 5,438,265, issued on Aug. 1, 1995, and assigned to AT&T Corp., discloses a cable-locating device that overcomes some of the difficulties of the prior art devices. The locating device disclosed in the patent utilizes an RF detector and a viewing mechanism, such as a television camera, or the like, in combination, to precisely locate a buried utility conveyance. Although this approach affords a higher degree of precision, excavation means must be provided within the device for removing the earth in the vicinity of the cable to allow observation by the viewing mechanism. The need for such excavation means renders the cable-locating device of U.S. Pat. No. 5,438,265 somewhat complex and relatively expensive.

Thus, there is a need for a simplified, lower-cost technique for locating a buried utility conveyance.

BRIEF SUMMARY OF THE INVENTION

Briefly, in accordance with the invention, a method is provided for precisely locating an underground utility conveyance. The method is practiced by applying a cable-locating tone and a cable confirmation tone to a metal conductor (e.g., a sheath or the like) carried by the conveyance. The cable-locating tone comprises an RF signal that is specific to the utility. The cable confirmation tone comprises a near DC level signal, typically no more than a few Hz so as not to radiate very far from the underground utility conveyance. To locate the buried utility conveyance, a technician monitors the cable-locating tone, via a first, above-ground detector, to determine the location at which the cable-locating tone has the greatest signal strength. In this way, the technician will establish the general location of the utility conveyance of interest. At the location where the cable-locating tone is found to have its greatest strength, a technician inserts a second detector, typically a magnetometer, into the earth. In this way, the technician measures the strength of the cable confirmation tone to verify the exact location of the underground utility conveyance of interest. Typically, the technician will insert the second detector into the earth at several discrete locations within the region where the cable-locating tone has its greatest strength to assure the precise location of the utility conveyance.

DETAILED DESCRIPTION

Figure 1:
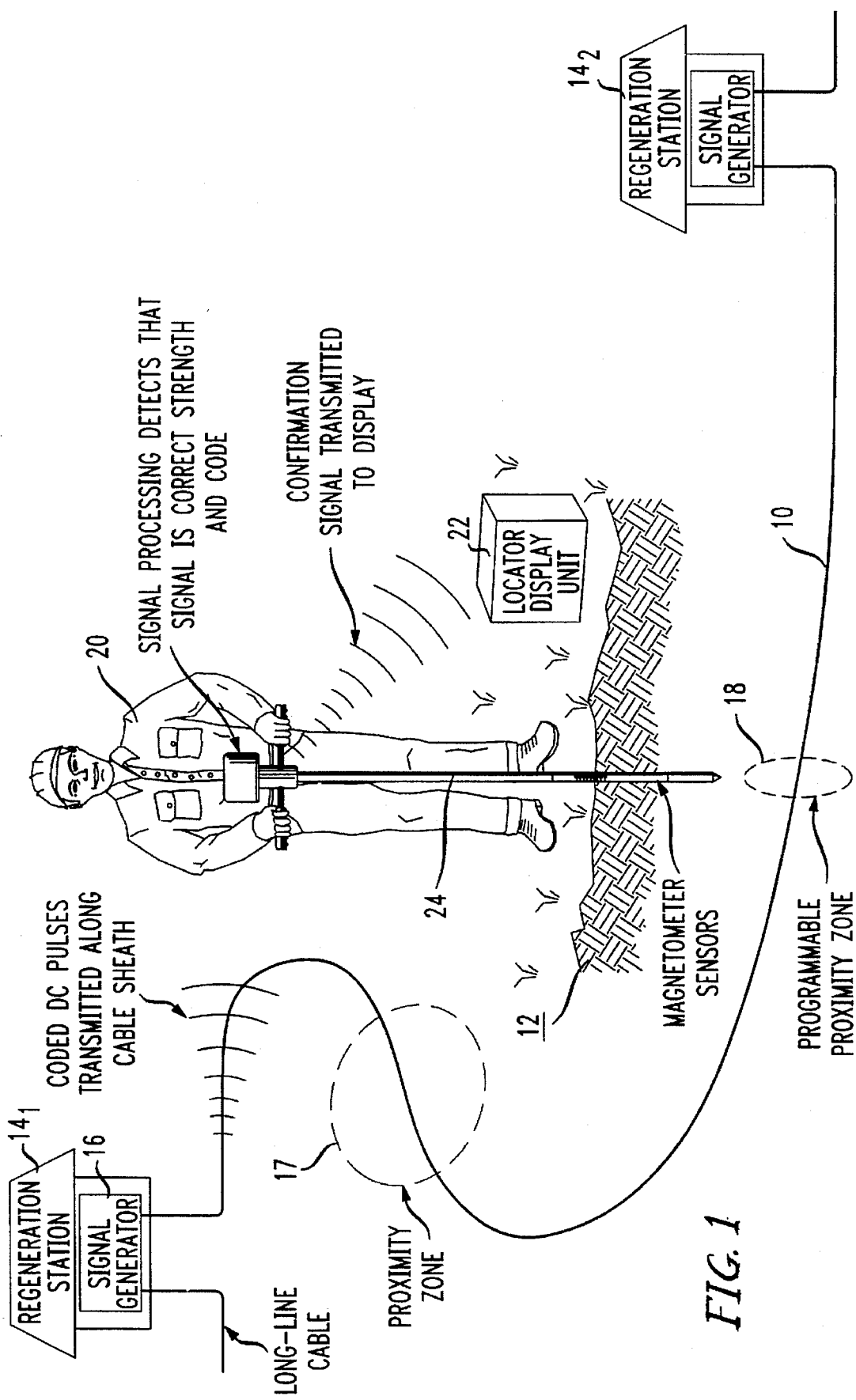
FIG. 1 is a block diagram illustrating the cable-locating technique of the present invention.

FIG. 1 shows a utility conveyance 10 that is buried below the earth 12 a depth of several feet (i.e., >1 meter). In the illustrated embodiment, the conveyance 10 comprises a cable that carries telecommunications traffic, either within a local exchange or between two such exchanges. Depending on the nature of the cable 10, and its overall length, it may be necessary to regenerate (i.e., boost) the strength of the signals carried by the cable at spaced intervals along its length. For that reason, the cable 10 is illustrated as running between a pair of regeneration stations $14_1$ and $14_2$ that boost the strength of the signals carried by the cable.

Occasionally, excavation must occur along the right-of-way of the cable 10. In accordance with the invention, the regeneration stations $14_1$ and $14_2$ have signal generator 16 for generating both a cable-locating tone and a cable-confirmation tone to facilitate location of the cable. Each generator 16 typically comprises a model LMS 3 signal generator made by Radiodetection Ltd. of the United Kingdom for simultaneously impressing both the cable-locating tone and the cable-confirmation tone on that length of cable extending to the next regenerator station.

The cable-locating tone comprises an RF signal at a frequency specific to the utility maintaining the cable 10. For example, AT&T, which maintains a large number of underground telecommunications cables, has at least one specific cable-locating frequency assigned to it. Other utilities, such those providing electric, water and/or gas, similarly have specifically assigned locating frequencies. The cable-locating tone is generally of a frequency, and of a power level sufficient to generate a field that radiates at least within a proximity zone 17 of a radius greater than the depth to which the cable 10 is buried below the earth 12. In this way, the cable-locating tone can be detected above ground.

The cable-confirmation tone comprises a relatively low strength, near DC signal, typically no more 5–10 Hz. The cable-confirmation tone impressed on the cable 10 has a particular pattern of pulses that is unique to the cable. When impressed with the cable-confirmation tone, the cable 10 will radiate a corresponding pulsed electromagnetic field within a relatively narrow zone 18. In practice, the strength and frequency of the cable-confirmation tone are chosen so that zone 18 extends not much further than a radius of approximately 6 inches (approximately 15.25 cm) about the cable 10. In contrast, the cable-locating signal causes the cable 10 to radiate a field within a relatively wide zone of at least several feet. Thus, the cable-locating tone can be sensed above the earth 10 whereas the cable confirmation tone may not.

To precisely determine the location of the cable 10 in accordance with the invention, a technician 20 first establishes the general location of the cable. To establish the general location of the cable, the technician 20 monitors the strength of the cable-locating tone impressed on the cable using a locator display unit 22. The locator display unit 22 typically comprises a PDL 3 signal receiver manufactured by Radiodetection Ltd. The region at which the locator display unit 22 detects the maximum level of the cable-locating tone corresponds to the general location of the cable 10.

Unfortunately, simply locating the region at which the cable-locating tone registers its greatest strength will not necessarily yield the precise location of the cable 10. Often, the cable 10 may be buried adjacent to other underground conveyances (not shown) that carry locating signals that interfere with the cable-locating tone generated by the signal generator 16. The selectivity of the locator display unit 22 is usually not great enough to distinguish between the cable-locating tone on the cable 10 and the locating signal on an adjacent conveyance with a high degree of specificity. As a result, the technician 20 only will know that the cable 10 lies somewhere in the general vicinity of the locator display unit 22. However, the precise location of the cable 10 still remains unknown.

After generally locating the cable 10, the technician 20 then inserts a magnetometer 24 (described further with respect to FIG. 2) into the earth 12 to detect the strength of the cable-confirmation tone impressed on the cable. As discussed above, the cable-confirmation tone comprises a near DC signal that generates a field that generally does not radiate much beyond the relatively narrow proximity zone 18. Typically, the proximity zone 18 is adjusted (by varying the frequency and/or strength of the cable-confirmation tone) to be less than the distance between the cable 10 and an adjacent utility conveyance that carries a locating signal. In this way, any interference between the cable-confirmation tone impressed on the cable 10, and the locating tone impressed on an adjacent underground conveyance will be minimized.

As discussed, the cable-confirmation tone impressed on the cable 10 has a unique pattern of pulses. Prior to inserting the magnetometer 24 into the earth 12, the technician 20 adjusts the magnetometer to respond only to the pulse pattern of the cable-confirmation tone impressed on the cable 10. Upon insertion into the earth 12 at a point within the proximity zone 18 of the cable 10, the magnetometer 24 will indicate the presence of the cable-confirmation signal, thus precisely locating the cable. Depending on the degree to which the cable 10 has been generally located via the locator display unit 22, the magnetometer may not be located within the proximity zone 18. Thus, it may be necessary to successively insert the magnetometer 24 into the earth 12 at each of several different locations in order to precisely locate the cable.

Figure 2:
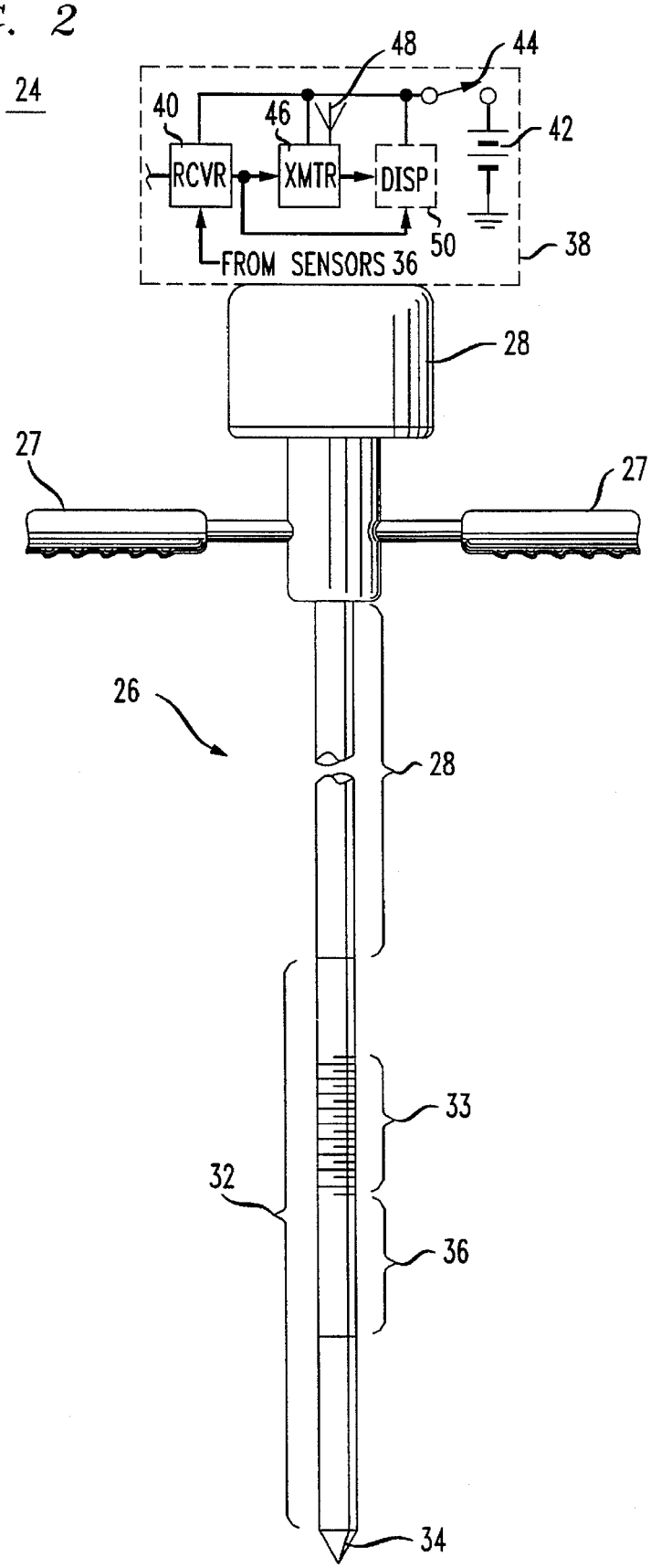
FIG. 2 is a block diagram of an apparatus for locating a cable-confirmation tone in accordance with the cable-locating technique depicted in FIG. 1.

FIG. 2 illustrates the details of the magnetometer 24. As seen in FIG. 2, the magnetometer 24 generally comprises a shaft 26 that carries a head 28 at its upper end. A pair of insulated handles 27—27 extends outwardly from the shaft 26 in opposite directions a short distance below the head 28 such that the handles are generally perpendicular to the axis of the shaft. The handles 27—27 allow the technician 22 of FIG. 1 to grab the magnetometer with two hands and to insert the shaft 26 into the earth 12 to a depth corresponding to the depth of the cable 10 of FIG. 1.

The shaft 26 is formed of two pieces, an upper steel rod 28, and a lower insulative rod 32 fabricated from fiberglass and having a steel tip 34 at its bottom. The fiberglass rod 32 may be provided with spaced-apart graduations 33 to measure the depth of insertion. Within the rod 32 is at least one, and preferably, a plurality of magnetometer sensors 36, typically Hall-effect sensors or the like, for sensing the cable-confirmation tone. The sensors 36 are connected to a detector circuit 38 located within the head 28 via a cable (not shown) that runs through the rods 28 and 32. The detector circuit 38 includes a pulse receiver 40 that is adjustable to detect an individual one of a plurality of pulse patterns. In this way, the receiver 40 can be adjusted to receive only the particular pulse pattern that corresponds to the pulse pattern of the cable-confirmation tone impressed on the cable 10 of FIG. 1. The receiver 40 is supplied with direct current from a battery 42 through a momentary switch 44 that extends through the head. The switch 44 allows the receiver 40 to be energized during intervals when the magnetometer 24 is in use, thereby conserving battery power.

The receiver 40 has its output coupled to a transmitter 46 that radiates signals indicative of the presence of the cable-confirmation tone through an antenna 48 for receipt by the locator display unit 22 of FIG. 1. In this way, the locator display unit 22 of FIG. 1 will display information to the technician 20 of FIG. 1 indicative of whether the particular cable-confirmation signal radiated by the cable 10 has been detected by the receiver 40. (For the receiver 40 to detect the cable-confirmation tone on the cable 10 of FIG. 1, the pulsed pattern of the tone must correspond to the receiver setting, and one or more of the magnetometer sensors 36 of FIG. 2 must be positioned within the zone of proximity 18 of FIG. 1.)

In addition to, or in place of, the transmitter 46, the circuit 38 may include an optional display 50, such as a liquid crystal display, or a conventional meter, that is visible through the head 28 for displaying the strength of the cable-confirmation tone. Obviously, if the receiver 40 has not detected the appropriate pulse pattern of the cable-locating tone, or if the magnetometer sensors 36 are outside the proximity range 18 of FIG. 1, then the display 50 will not register receipt of the cable-locating tone. Both the transmitter 46 and the display 50 are energized from the battery 42 through the switch 44 like the receiver 40 in order to minimize battery drain.

The foregoing describes a technique for precisely locating an underground utility conveyance (cable) 10 by impressing on the cable both a cable-locating tone having a relatively wide proximity zone, and a cable-confirmation tone having a relatively narrow proximity zone.

It is to be understood that the above-described embodiments are merely descriptive of the principles of the invention. Various modifications and changes may be made thereto by those skilled in the art that will embody the principles of the invention and fall within the spirit and scope thereof.

What is claimed is:

1. A method for precisely locating a utility conveyance buried a prescribed depth below the earth, comprising the steps of:

impressing a conveyance-locating tone on the conveyance so that the conveyance radiates a first electromagnetic field within a first proximity zone that has a radius about the conveyance at least as great the depth of burial of the conveyance;

impressing on the conveyance a low frequency conveyance-confirmation tone that is pulsed in a particular pattern unique to the conveyance to be located so that the conveyance radiates a second electromagnetic field unique to the conveyance within a second proximity zone that has a radius about the conveyance less than the depth below which the conveyance is buried;

sensing, via a first signal detector located above the earth, where the first electromagnetic field has its greatest strength to establish a region where the conveyance is generally located;

inserting into the earth, within the region where the conveyance is generally located, a second signal detector to detect whether the second field is present, and if the second field is not present then;

inserting the second signal detector in the earth at successive positions within the region where the conveyance is generally located until the second field has been detected.

2. The method according to claim 1 wherein the second field is detected as being present only if the field has a strength above a predetermined level and the prescribed pattern of pulses is found.

3. The method according to claim 1 further including the step of transmitting information from the second detector to the first detector indicating the presence of the second field.

4. The method according to claim 1 wherein the conveyance-locating tone and the conveyance-confirmation tone are impressed simultaneously on the conveyance.

5. Apparatus for precisely locating a utility conveyance buried a prescribed depth below the earth comprising:

means for impressing a conveyance-locating tone on the conveyance so that the conveyance radiates a first electromagnetic field within a first proximity zone that has a radius about the conveyance at least as great the depth of burial of the conveyance, and for impressing a low frequency conveyance-confirmation tone that is pulsed in a particular pattern unique to the conveyance to be located so that the conveyance radiates a second electromagnetic field unique to the conveyance within a second proximity zone that has a radius about the conveyance less than the depth below which the conveyance is buried;

a first signal detector located above the earth for sensing where the first field has its greatest strength to establish a region where the conveyance is generally located; and a second signal detector that is insertable within the earth to detect if the second field is present.

6. The apparatus according to claim 5 wherein the second signal detector comprises:

a least one magnetometer sensor for sensing the second field;

a shaft for carrying the sensor;

a pair of handles extending out from the shaft in opposite directions to enable an operator to drive the shaft into the earth to insert the sensor therein;

a head carried by the shaft above the handles; and a detector circuit situated within the head and responsive to the sensor for indicating if the second field is present.

7. The apparatus according to claim 6 wherein the detector circuit includes a transmitter for transmitting a signal indicative of the presence of the second field to the first detector.

8. The apparatus according to claim 6 wherein the second detector further includes a display for indicating the strength of the second field.

* * * * *